United States Patent
Garrard (10) Patent No.: US 6,557,872 B1
(45) Date of Patent: May 6, 2003

(54) REPLACEMENT APPARATUS PROVIDING SELECTABLE CAMBER/CASTER CORRECTION

(75) Inventor: James H. Garrard, Boulder, CO (US)

(73) Assignee: Ingalls Engineering Company, Inc., Louisville, CO (US)

( * ) Notice: Subject to any disclaimer, the term of this patent is extended or adjusted under 35 U.S.C. 154(b) by 0 days.

(21) Appl. No.: 09/919,282

(22) Filed: Jul. 31, 2001

Related U.S. Application Data (63) Continuation-in-part of application No. 09/703,780, filed on Oct. 31, 2000.

(51) Int. Cl.$^7$ .................................................. B62B 7/00
(52) U.S. Cl. ........................... 280/86.751; 280/86.754; 280/93.512
(58) Field of Search .................... 280/86.75, 86.751, 280/86.754, 86.756, 93.512, 124.127

(56) References Cited

U.S. PATENT DOCUMENTS

| | | | | |
|---|---|---|---|---|
| 2,605,118 A | * | 7/1952 | Booth et al. | 280/96.2 |
| 2,882,066 A | * | 4/1959 | Petrak | 280/96.2 |
| 4,836,574 A | * | 6/1989 | Ingalls | 280/661 |
| 4,867,472 A | * | 9/1989 | Ward | 280/661 |
| 4,921,271 A | | 5/1990 | Berry et al. | |
| 4,953,889 A | * | 9/1990 | Reilly | 280/661 |
| 5,697,632 A | * | 12/1997 | Burman et al. | 280/661 |
| 5,951,030 A | * | 9/1999 | Butler | 280/86.751 |
| 6,176,501 B1 | * | 1/2001 | Bartolone | 280/86.756 |
| 6,224,075 B1 | | 5/2001 | McIntyre | |
| 6,302,416 B1 | * | 10/2001 | Schmack | 280/93.512 |

OTHER PUBLICATIONS

Specialty Products Company; Honda/Acura Adjustable Ball Joint: Publication date unknown (Product Advertisement).
Northstar Manufacturing; Xtrarange Adjustable Alignment Products for Lowered Vehicles: Publication date unknown; (Product Advertisement).
2000–20001 Total Wheel Alignment Sourcebook: Specialty Products Company; p. 51; Publication Date Unknown; Product Catalogue.
1998–1999 Alignment Products Catalogue; Northstar Manufacturing Company, Inc.; p. 74; Publication Date unknown.

* cited by examiner

Primary Examiner—Lesley D. Morris
Assistant Examiner—Tony Winner
(74) Attorney, Agent, or Firm—Harold A. Burdick (57) ABSTRACT

A replacement apparatus for a ball joint for conveniently modifying motor vehicle suspension camber, caster or camber/caster combination angle by means of repositioning a wheel suspension steering knuckle top or bottom relative to a knuckle mount. The apparatus includes a body with an orientation mark and positioning teeth, a lower support with degree offset marks and matching positioning teeth, a bearing insert, an upper support, and a shaft.

19 Claims, 10 Drawing Sheets

REPLACEMENT APPARATUS PROVIDING SELECTABLE CAMBER/CASTER CORRECTION

RELATED APPLICATION

This application is a Continuation-In-Part of pending U.S. patent application Ser. No. 09/703,780 filed on Oct. 31, 2000 by Robert M. Allman and James H. Garrard and entitled "APPARATUS AND METHOD PROVIDING ADJUSTABLE VEHICLE BALL JOINT POSITIONING".

FIELD OF THE INVENTION

This invention relates to wheel adjustment/alignment apparatus and methods for vehicles, and, more particularly, relates to apparatus and methods for adjusting the control arm/wheel spindle relationship at an upper or lower ball joint connection to produce changes in the camber, caster or camber/caster combination angle of a vehicle wheel.

BACKGROUND OF THE INVENTION

Most vehicles consist of a tire/wheel mounted to a spindle which is attached to the vehicle through upper and lower control arms with the main connection being through ball joints mounted to the control arms. Some vehicles, however, are manufactured without provision for adjusting camber angle in the wheels. For example, some vehicles utilize an 'A' shaped upper control arm with 'silent-bloc' type pivot isolators pressed into the inner pivot locations of the arm. The inner control arm in some such cases has a 'u' shaped bracket welded into it, with cross-holes in the inner bracket and inner control arm for locating the mounting bolts that engage and clamp the 'silent-bloc' pivot isolators. This arrangement locates the inner pivots of the upper control arm in a fixed position with no means of adjustment.

The camber and caster angles of the tire/wheel (relative to the vehicle frame) directly effect vehicle handling and tire wear and is therefore of great importance. Camber angle is typically specified by the factory at a specific vehicle ride height (the distance from the ground to some point in the vehicle suspension corresponding to the vehicle frame center of gravity). The camber angle established between the plane of the tire and wheel and the vertical plane through the vehicle frame is directly impacted by any changes in the suspension components. Such changes can occur through damage to the components or through modification, intentional or unintentional, to the vehicle ride height. Thus, vehicles with raised or lowered ride height or damaged suspension links will typically not maintain proper camber angle and require means for readjusting the camber angle to the original specifications if handling and tire longevity are not to be sacrificed. Moreover, it may become desirable to correct a mis-aligned vehicle with other than strictly camber corrections.

One current means for adjusting camber angle consists of changing the relative position of the control arm to the vehicle at the body mounting points. This allows the control arm, and thus the ball joint position, to be moved laterally with respect to the vehicle, thereby changing the camber angle of the spindle and the tire/wheel. This method will not work if the vehicle's control arm mounting scheme prevents replacing the fixed control arm body mounts with an adjustable mounting apparatus.

Another current means for adjusting camber angle provides for replacement of the upper or lower ball joint with an offset ball joint that, when rotated, allows changes of the position of the spindle mounting point around an offset arc. While this enables the camber angle to be modified, it at the same time modifies the caster angle, sometimes undesirably, due to its fixed radial offset arc.

For some vehicles, such as Jeep Grand Cherokee, Jeep TJ and Dodge 1500, there are presently two means available to adjust camber angle on the front wheels of the vehicles. These vehicles are provided with no factory adjustment of camber angle, original equipment consisting of a lower ball joint that can pivot and rotate and an upper ball joint that is fixed in all but vertical movement (to allow for tolerance in the axle and spindle machinings). While typically referred to herein, and in the automotive industry, as a "ball joints", this is not technically correct terminology since such units pivot about their shaft centerlines and do not pivot and rotate about a fixed "ball". The units are actually upper or lower spindle pivots.

Nevertheless, in allowing for axial travel of the shaft, the unit incorporates a plastic sleeve with a ridge mated to a wide groove in the shaft to prevent the shaft from separating from the body. This method is not particularly vigorous but may be adequate since there is no vertical force transmitted through the upper pivot during vehicle use (even though there may be during installation and removal of the upper pivot).

One means for camber adjustment is a copy of the original equipment upper pivot and consists of replacing the upper spindle pivot with a unit having a rotating shaft that is offset and angled (to maintain shaft alignment with the lower ball joint pivot point) in the unit body which is press fit into the top of the axle. This unit provides only four different offsets (0.5, 1, 1.5, and 2 degrees), but the unit can be rotated as installed to yield combinations of caster and camber adjustment. Because of the limited offsets available, this unit addresses only a limited range of combinations of camber/caster problems.

A second known means addresses adjustability at the lower ball joint. A new ball joint with a machined offset stud replaces the original part. Currently, only two offsets are available with such means, but as above the unit can be rotated when installed to provide combinations of caster and camber adjustment. Problems occur with this unit, however, since it addresses only a few of the possible combinations of camber/caster problems, and because it may also adversely affect steering since the offset in the ball joint will change camber and caster as the wheel is steered back and forth. The lower ball joint is also vertically and laterally load bearing and more prone to failure than the upper ball joint, making it a less than ideal candidate for such replacements. Further improvements could thus be still be utilized.

SUMMARY OF THE INVENTION

This invention provides apparatus for selective positioning of a vehicle wheel suspension, or steering, spindle or knuckle relative to a control arm or knuckle mount to provide adjustability of wheel camber, wheel caster, and/or a combination of wheel camber and caster. The apparatus is simple to install and adjust, requires no modification of other suspension components, provides for adjustment of wheel camber independent of caster adjustment, and is versatile, offering a wide range of possible offsets.

The apparatus includes an insert (or body) that is secured with the knuckle mount. An elongated slot extends through the insert between first and second contact surfaces, the second contact surface having positioning structure defined thereat. A lower support assembly, secured at the knuckle and positioned through the slot of the insert, is selectively linearly located and secured along the slot. Mating positioning structure at a surface of a flange at the lower support assembly is engageable by the positioning structure of the insert. The lower support assembly preferably includes a bearing insert fit in an interior cavity of a support unit having the flange thereat. A shaft is receivable through the bearing insert for maintenance in the cavity and is secured at the knuckle.

A guide channel is defined at the first contact surface of the insert. An upper support assembly includes a securing member and a slide receivable at one part of the lower support assembly. The slide is linearly moveable in the guide channel. The securing member is receivable at an engagable (preferably threaded) end of the lower support assembly to thereby secure engagement of the positioning structures and selected location of the lower support assembly along the slot.

The apparatus of this invention allows for large camber/caster angle adjustments by providing a means to change the upper shaft offset while maintaining the alignment with the lower ball joint, and is a suitable replacement for original equipment. The apparatus incorporates teeth to maintain angular position and can be installed in any rotation to allow for all combinations of camber/caster angle in 0.25 degree increments (from 0 to 2.5). Angular adjustability of the apparatus shaft centerline provides complete camber/caster angle coverage for the vehicle alignment requirements while using only one assembly of parts (not multiple part offsets as heretofore known) while not adversely affecting wheel caster angle during vehicle turning operations. A common center point between apparatus body/mount and upper lower supports allows for smooth adjustment at all angle increments while maintaining the fixed distance between the upper and lower knuckle mounts.

It is therefore an object of this invention to provide apparatus for selective positioning of a vehicle ball joint relative to a control arm to provide adjustability of wheel camber, wheel caster, and/or a combination of wheel camber and caster.

It is another object of this invention to provide an apparatus for selective vehicle wheel angle positioning that is simple to install and adjust on a vehicle, requires no modification of other suspension components, provides for adjustment of wheel camber independent of caster adjustment, and is versatile, offering a wide range of possible offsets.

It is still another object of this invention to provide apparatus for selective positioning of a vehicle wheel suspension knuckle relative to a knuckle mount, the apparatus securable between the knuckle mount and the knuckle and including an insert securable at the knuckle mount and having first and second contact surfaces, a slot extending therethrough between the contact surfaces and positioning structure defined at the second contact surface, and a lower support assembly securable at the knuckle and positionable through the slot of the insert to the first contact surface thereof and selectively linearly locatable and securable along the slot, the lower support assembly having mating positioning structure at a surface thereof engageable by the positioning structure of the insert.

It is yet another object of this invention to provide a replacement apparatus mountable at a vehicle knuckle mount opening and at a wheel suspension knuckle to provide selectable angular correction of a vehicle wheel that includes an insert securable in the knuckle mount opening and having first and second contact surfaces with a guide channel defined at the first contact surface and positioning structure defined at the second contact surface, a slot extending through the insert between the contact surfaces, a lower support assembly securable at the knuckle and having one part positionable through the slot of the insert with an engageable end thereof extending above the first contact surface of the insert, the one part selectively linearly locatable along the slot and having mating positioning structure at a surface thereof engageable by the positioning structure of the insert, and an upper support assembly including a slide and a securing member, the slide receivable at the one part of the lower support assembly and at the guide channel of the first contact surface of the insert, the securing member receivable at the engagable end of the one part of the lower support assembly to thereby secure engagement of the positioning structures and selected location of the one part of the lower support assembly along the slot.

It is yet another object of this invention to provide an apparatus mountable between a steering knuckle and knuckle mount to accommodate adjustment of vehicle wheel camber, caster, or camber/caster angle that includes a body having first and second surfaces and an elongated slot through the body between the surfaces, a guide channel being defined at the first surface, the body securable at the knuckle mount, a support having a threaded end receivable through the elongated slot of the body, a flange at an opposite end thereof to engage the second surface of the body, and an interior cavity, a bearing insert securable in the interior cavity of the support, a shaft receivable through the bearing insert and securable at the knuckle, a slide maintained over the threaded end of the support, the guide channel of the body receiving and guiding linear movement of the slide, and a retainer for engaging the threaded end of the support to thereby secure engagement of the flange of the support and the second surface of the body and selected location of the support along the elongated slot.

With these and other objects in view, which will become apparent to one skilled in the art as the description proceeds, this invention resides in the novel construction, combination and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
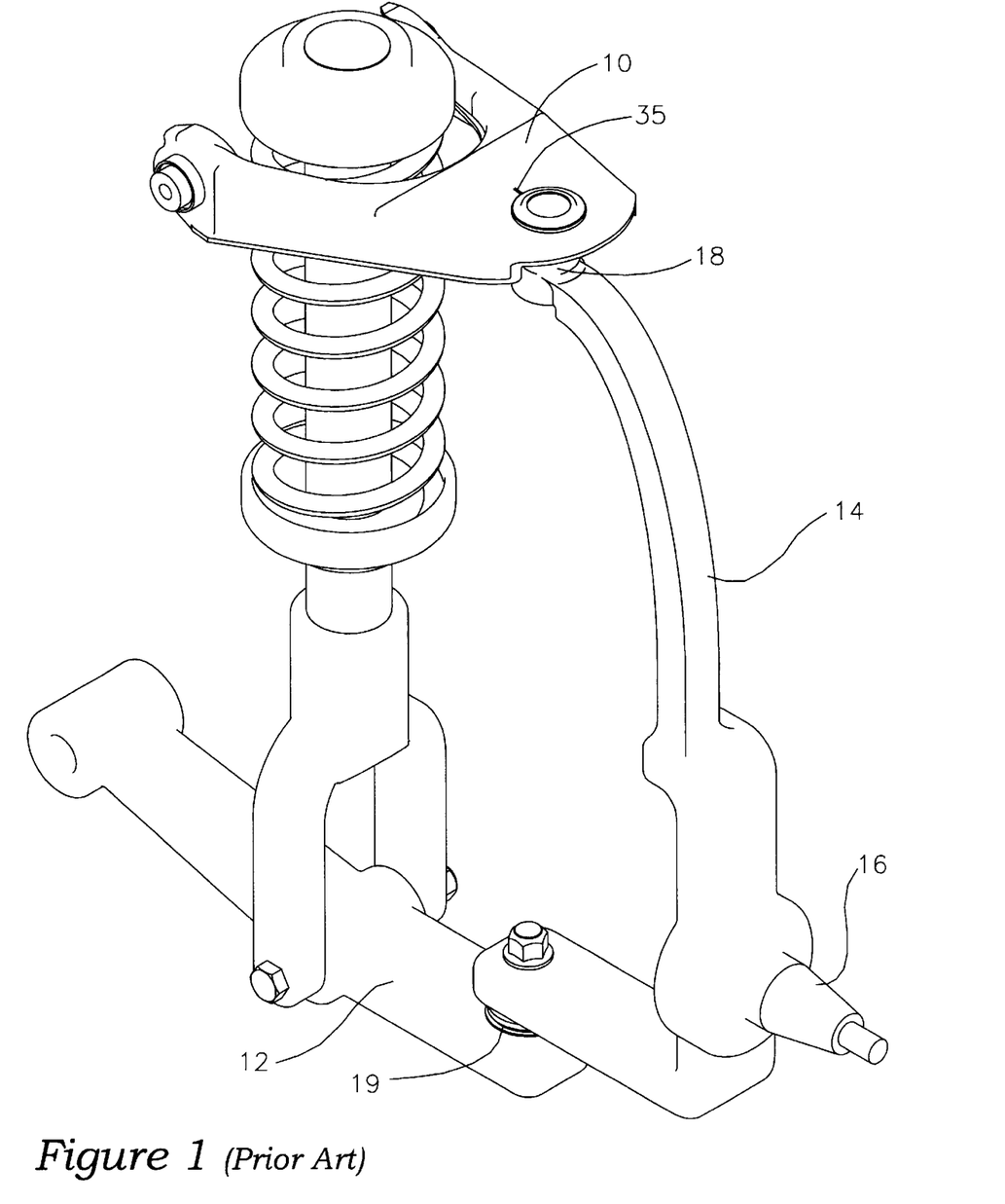
FIG. 1 illustrates one typical suspension system on a vehicle as supplied by a manufacturer.

FIG. 1 illustrates a first typical suspension system on a vehicle as supplied by the manufacturer. Upper control arm 10 and lower control arm 12 are both attached to the vehicle frame (not shown). Spindle 14, which includes wheel mount 16 for supporting a wheel with a tire mounted thereon (not shown), is pivotably attached to each control arm through upper ball joint 18 and lower ball joint 19, the ball joints spaced a fixed distance apart by spindle 14.

Figure 2:
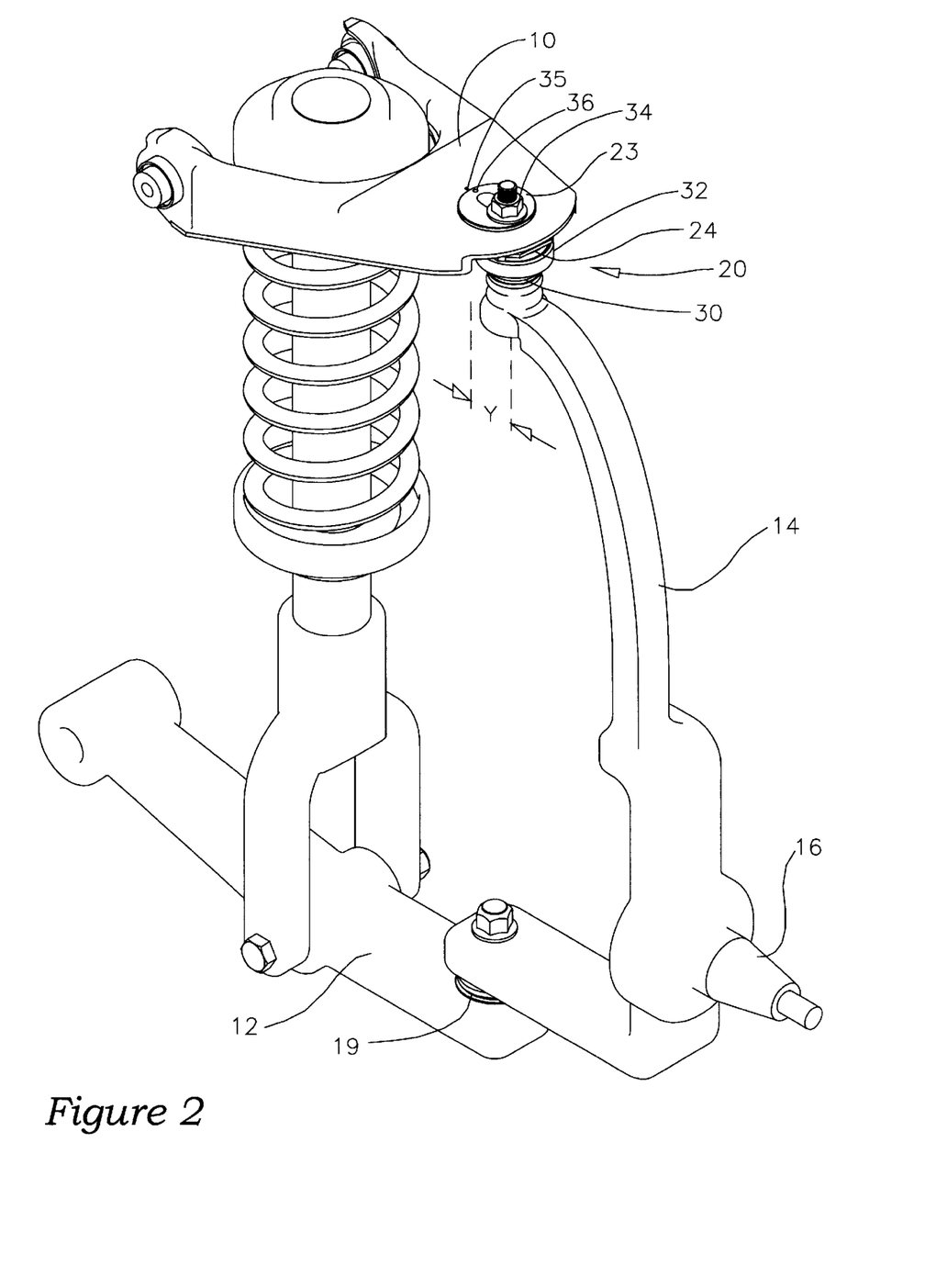
FIG. 2 illustrates the suspension system of FIG. 1 with a first embodiment of the apparatus of this invention installed.
Figures 3, 7:
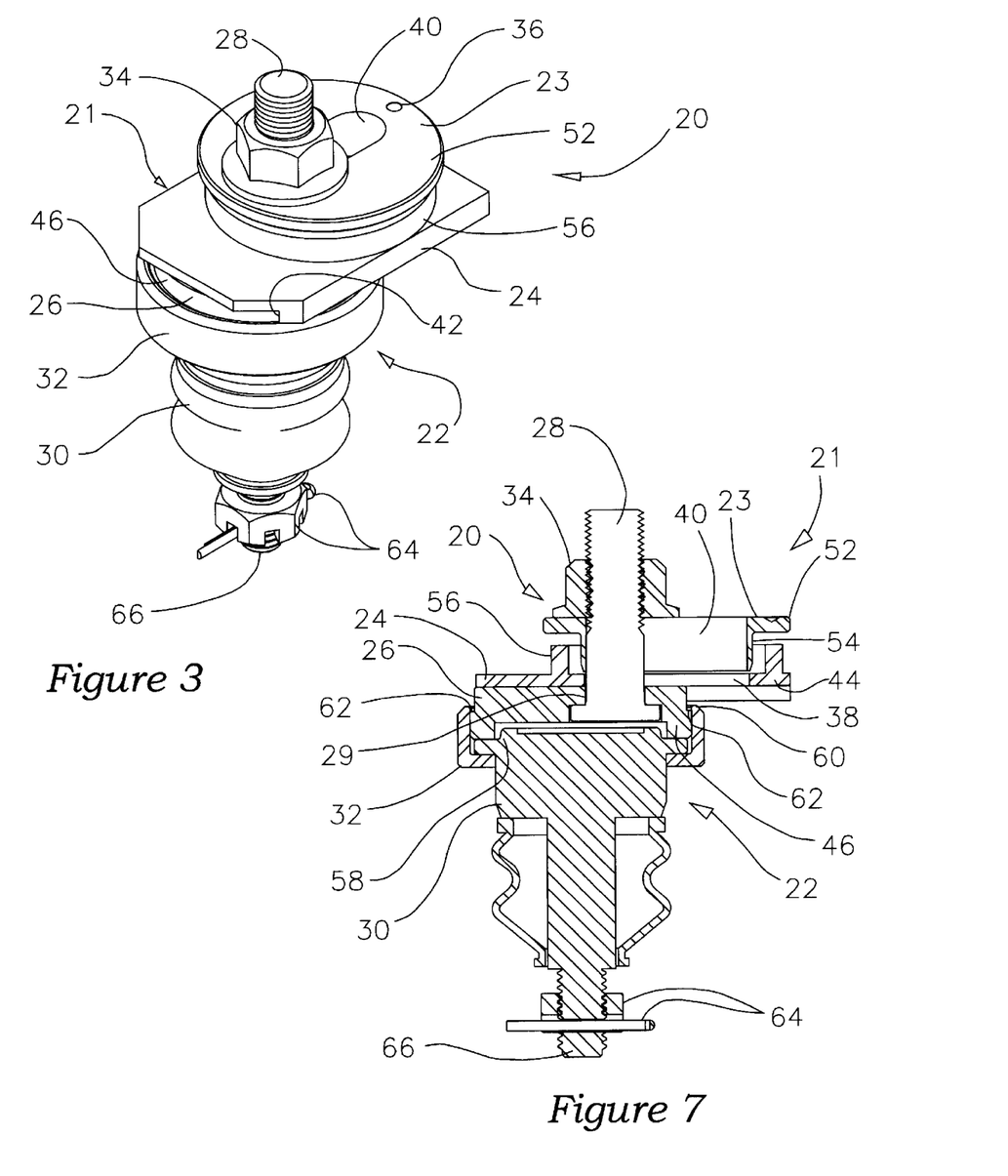
FIG. 3 is a perspective view of the camber/caster adjusting apparatus of FIG. 2.
FIG. 7 is a sectional view taken along section line 7—7 of FIG. 4.
Figure 4:
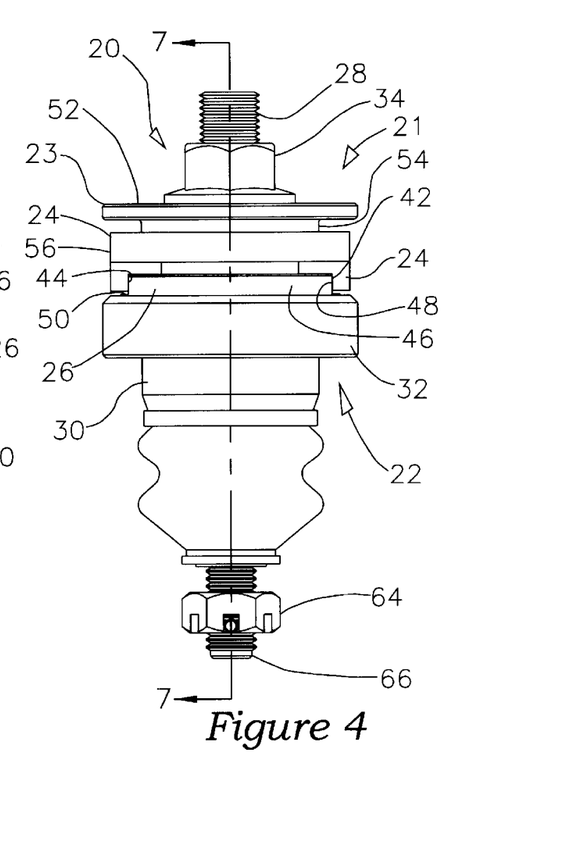
FIG. 4 is a front elevation view of the apparatus of FIG. 3.
Figure 5:
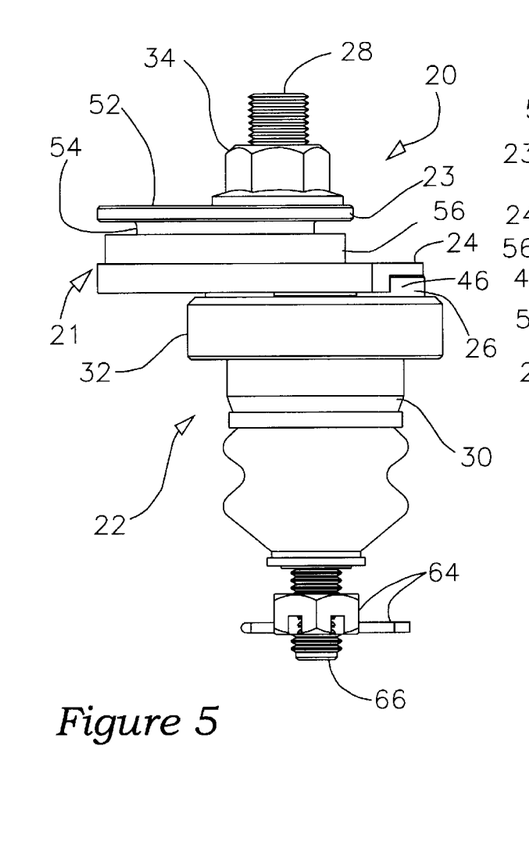
FIG. 5 is a side elevation view of the apparatus of FIG. 3.
Figure 6:
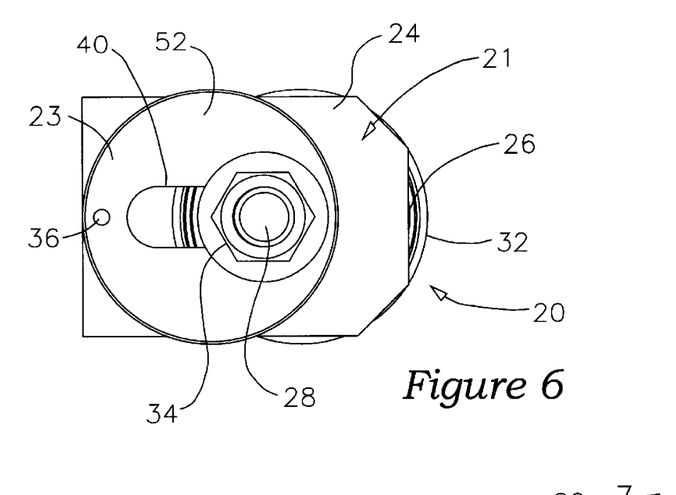
FIG. 6 is a top elevation view of the apparatus of FIG. 3.

FIG. 2 shows the suspension of FIG. 1 with a first embodiment of a camber/caster adjusting apparatus 20 of this invention replacing the factory ball joint 18 for selective translation of the position of the upper ball joint along a linear distance "Y", either inward towards the vehicle frame or outward away from the vehicle frame. When set as illustrated and discussed in greater detail hereinbelow, the effect of movement in the "Y" direction will be to decrease or increase, respectively, the camber angle established by the plane of the tire and wheel with the vertical plane of the vehicle frame in the direction from front to back of the vehicle. While use with the upper ball joint is illustrated herein, the apparatus could be applied to replace lower ball joint 19 and/or applied at both locations.

Camber/caster adjusting apparatus 20, as shown in FIGS. 3 through 8, includes guide assembly 21 and mount assembly 22. Guide assembly 21 includes insert 23 and guide plate 24 maintained at opposite sides of control arm opening 25 (see FIG. 8). Mount assembly 22 includes slide 26 having offset stud 28 extending therefrom through opening 29. Ball joint 30 is held at slide 26 by collar 32. The apparatus is held in relative positions, as discussed hereinafter, by fastener 34 (for example a flange nut), ball joint 30 affixable at spindle 14 conventionally.

Insert 23 is pressed into opening 25 of upper control arm 10 (and/or lower control arm 12) in place of the factory supplied ball joint (18 of FIG. 1). For camber only adjustment, insert 23 is oriented along the neutral caster angle by alignment of orientation mark 35 on the control arm (see FIG. 2) and a corresponding dimple or other orientation mark 36 on insert 23. Guide plate 24 and insert 23 each have a slot 38 and 40, respectively, which are substantially coextensive and along which stud 28 is linearly movable. Substantially parallel guide ridges 42 and 44 at guide plate 24 maintain rotational stability and guide linear movement of slide body 46 of slide 26, by guiding engagement adjacent to spaced substantially parallel edges 48 and 50 of slide body 46.

While a particular structure is shown for the guiding and stabilizing interrelationship of guide plate 24 and slide 26, many different configurations at guide plate 24 and mating configuration at slide 26 could be utilized to achieve the same purpose. For example, the guide ridges may be positioned at slide 26 and the matable edges at guide plate 24, or multiple spaced channels or a single centered channel could be provided at either guide plate 24 or slide 26 with corresponding structure at the other configured to ride in the channel or channels.

Insert 23 includes a flange 52 and rim 54, slot 40 defined through rim 54. Rim 54 extends through opening 25 of control arm 10 and is received adjacent to annular extension 56 of guide plate 24. Ball joint 30 is secured at slide 26 by means of a press fit of ball joint end 58 and slide 26 into collar 32 with the addition of a staking process to provide a material deformation of collar end 60 over annular lip 62 of slide 26 to mechanically retain the unit (see FIG. 7). Ball joint 30 may be a factory supplied ball joint and is attached at its other end to spindle 14 using conventional means (applying nut and pin assembly 64 to lower threaded stud 66 after application thereof through opening 67 of spindle 14, for example).

When ball joint 30 is connected to slide 26, it can be seen that the central longitudinal axis of stud 28 is offset relative to the central longitudinal axis of ball joint 30. This offset provides greater extent of wheel angle adjustability, since neutral adjustment, corresponding to alignment of the central axis of ball joint 30 (vertical axis in the FIGURES) with the central axis of opening 25 in control arm 10 (and thus the central axis of insert 23), locates stud 28 near an end of slots 38 and 40 of guide plate 24 and insert 23.

Figure 8:
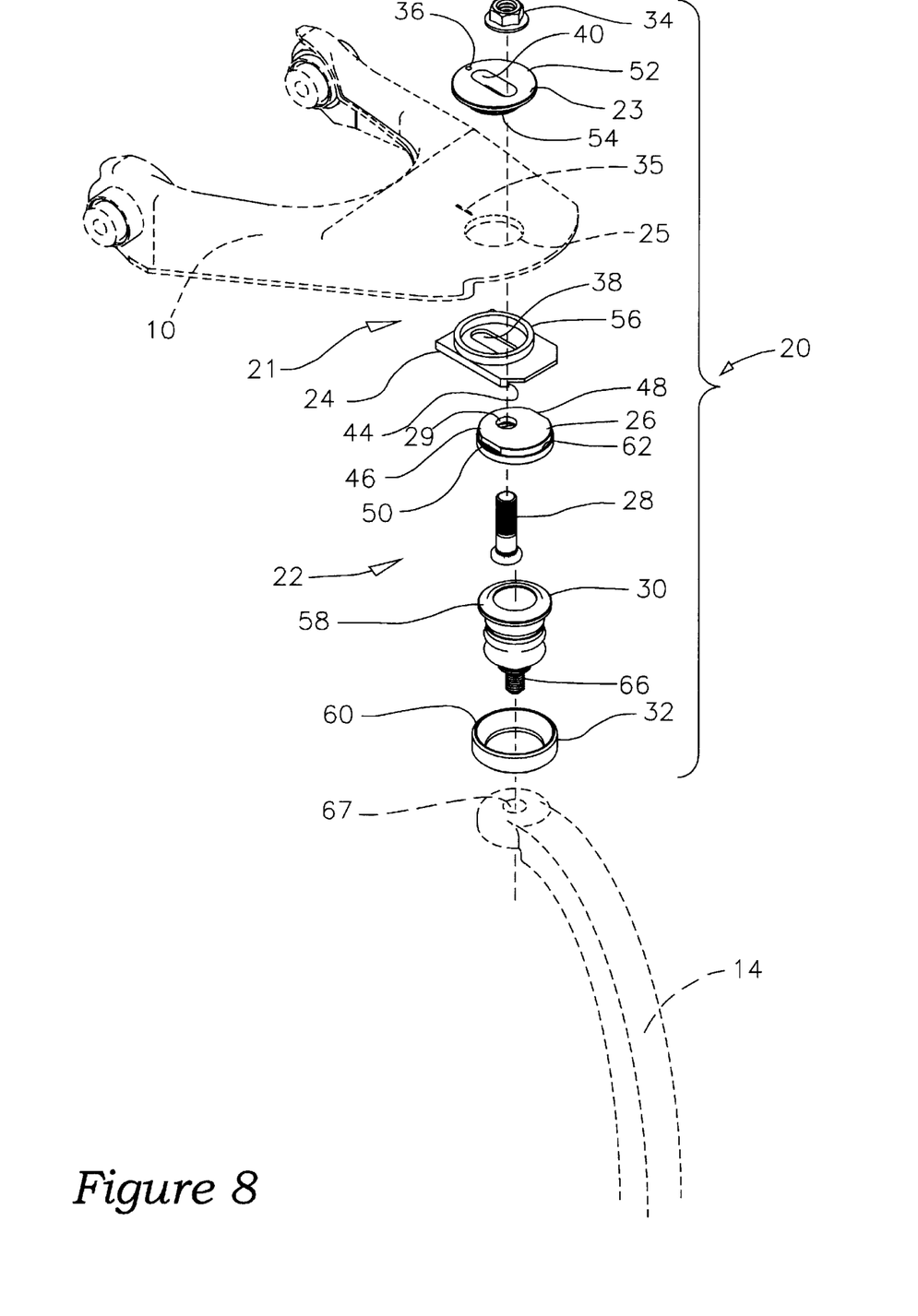
FIG. 8 is an exploded view of the camber/caster adjusting apparatus of FIG. 3.

In use, insert 23 is installed into opening 25 of vehicle suspension control arm 10 (or other selected member) with orientation mark 36 at a selected position to achieve the desired direction of angle adjustability. For example, to allow camber only adjustment, insert 23 should be mounted with marks 35 and 36 aligned as shown in FIGS. 2 and 8 (caster neutral alignment), so that the length of slots 38 and 40 of guide plate 24 and insert 23 are also aligned with the guide marks.

Guide plate 24, with slide 26 thereat having stud 28 extending through slot 38, is positioned at the opposite side of control arm 10. Ball joint 30 may be attached to spindle 14 in advance of or after installation of mount assembly 22 at guide assembly 21 with stud 28 extending through slot 40 of insert 23 (and thus through opening 25 of control arm 10) and held by nut 34. Slide 26, with edges 46 and 48 engaging ridges 42 and 44 of guide plate 24 to stabilize and guide slide 26, when moved in guide plate 24 allows only linear movement of stud 28 in opening 25 perpendicular to the axis of the opening. This sliding movement provides tire/wheel camber adjustment without affecting caster angle (when aligned for caster neutral adjustment as shown in FIG. 2). When the desired angle is achieved (with ball joint 30 and the central axis of opening 25 of control arm 10 in a selected relative position), nut 34 is tightened to retain the interrelationship of the components thus established by securing stud 28 at the selected position relative to the axis of opening 25 and along slots 38/40 and slide 26 at guide plate 24.

Should readjustment be desired, nut 34 may be loosened and mount assembly 22 of apparatus 20 can be moved inward (towards the vehicle frame) or outwards (away from the frame) by moving threaded stud 28 in guide assembly slots 38/40 until the corrected angle is achieved. The position of apparatus 20 is then fixed by applying sufficient torque to flange nut 30.

As may be appreciated, the above described apparatus of this invention could be modified for installation in such a way as to affect only caster angle or in such a way as to affect both caster and camber angles. A geometric relationship exists between the upper and lower wheel spindle connections (ball joints 18 and 19) and the camber and caster angles of the wheel to the vehicle. As previously indicated, altering the position of one of the ball joints in the neutral caster direction affects the camber angle in a desired fashion. Extending this to caster and camber/caster combination corrections and adjustments, the camber/caster adjusting apparatus of this invention can be used to adjust caster only angles or some combination of camber and caster. If so desired, by rotating insert 23 to another position of orientation mark 36 relative to mark 35 on upper control arm 10 during installation, camber/caster adjusting apparatus 20 can be rotated in a predetermined fashion to provide for adjustment of caster only or some combination of camber and caster angles.

Figure 9:
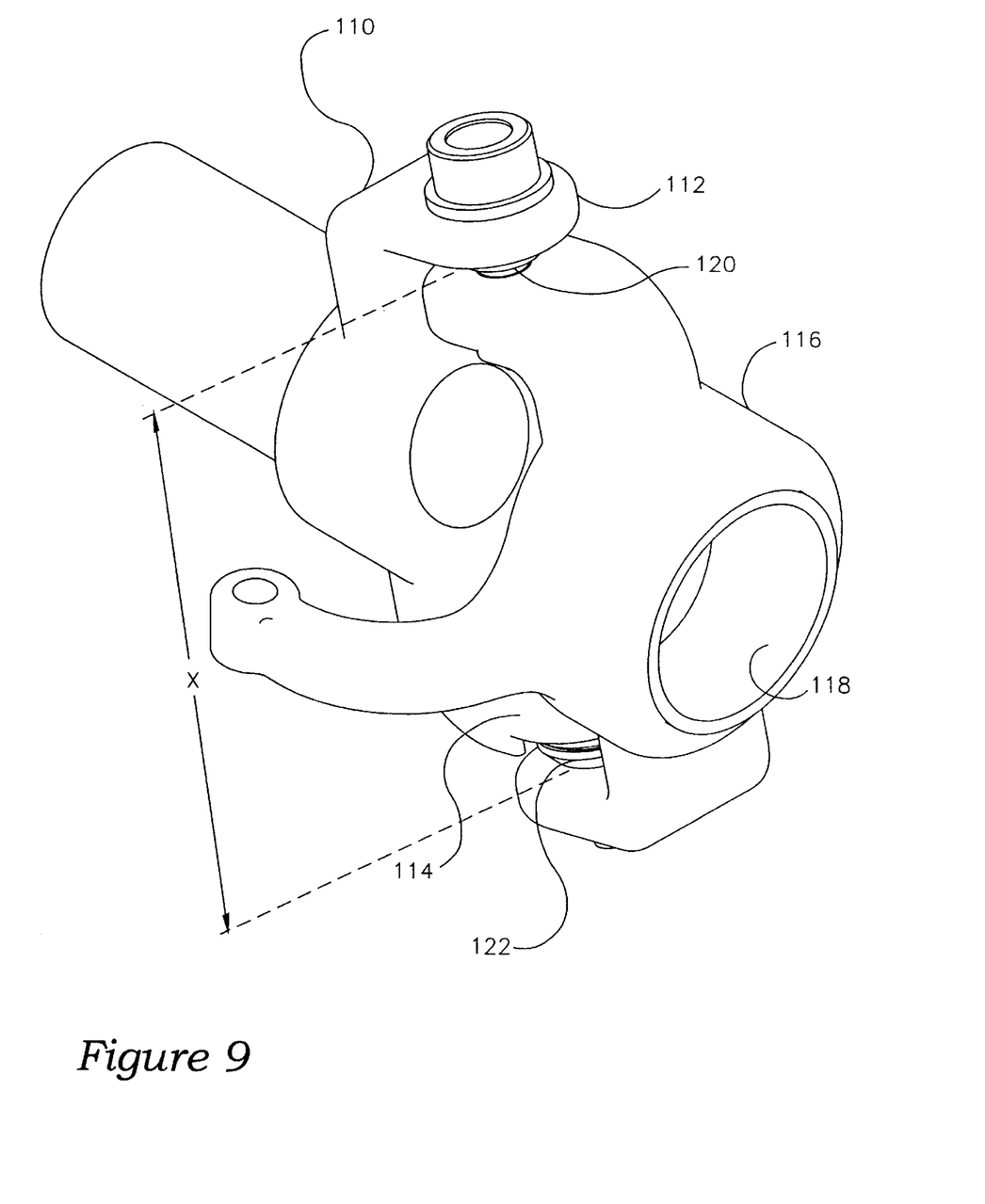
FIG. 9 illustrates a second typical suspension system on a vehicle as supplied by a manufacturer.

FIG. 9 shows a second typical type of suspension system found on other vehicles as supplied by the manufacturer. It consists of axle housing 110 attached to the vehicle frame (not shown) which incorporates upper knuckle mount 112 and lower knuckle mount 114. Knuckle 116 which includes axle hole 118 as clearance for a wheel axle (not shown) supporting a wheel with a tire mounted thereon (also not shown), is pivotally attached to upper knuckle mount 112 and lower knuckle mount 114 through upper ball joint 120 with two degrees of freedom (vertical and rotational about its cylindrical axis aligned with lower knuckle mount 114) and through lower ball joint 122 with three degrees of freedom (angular rotation about its center point and rotation about its cylindrical axis aligned with upper knuckle mount 112). The ball joints are spaced apart at a fixed distance "X" by knuckle 116. The arrangement of upper ball joint 120 and lower ball joint 122 provide the axis necessary for knuckle 116 to pivot during vehicle steering operations.

Figure 10:
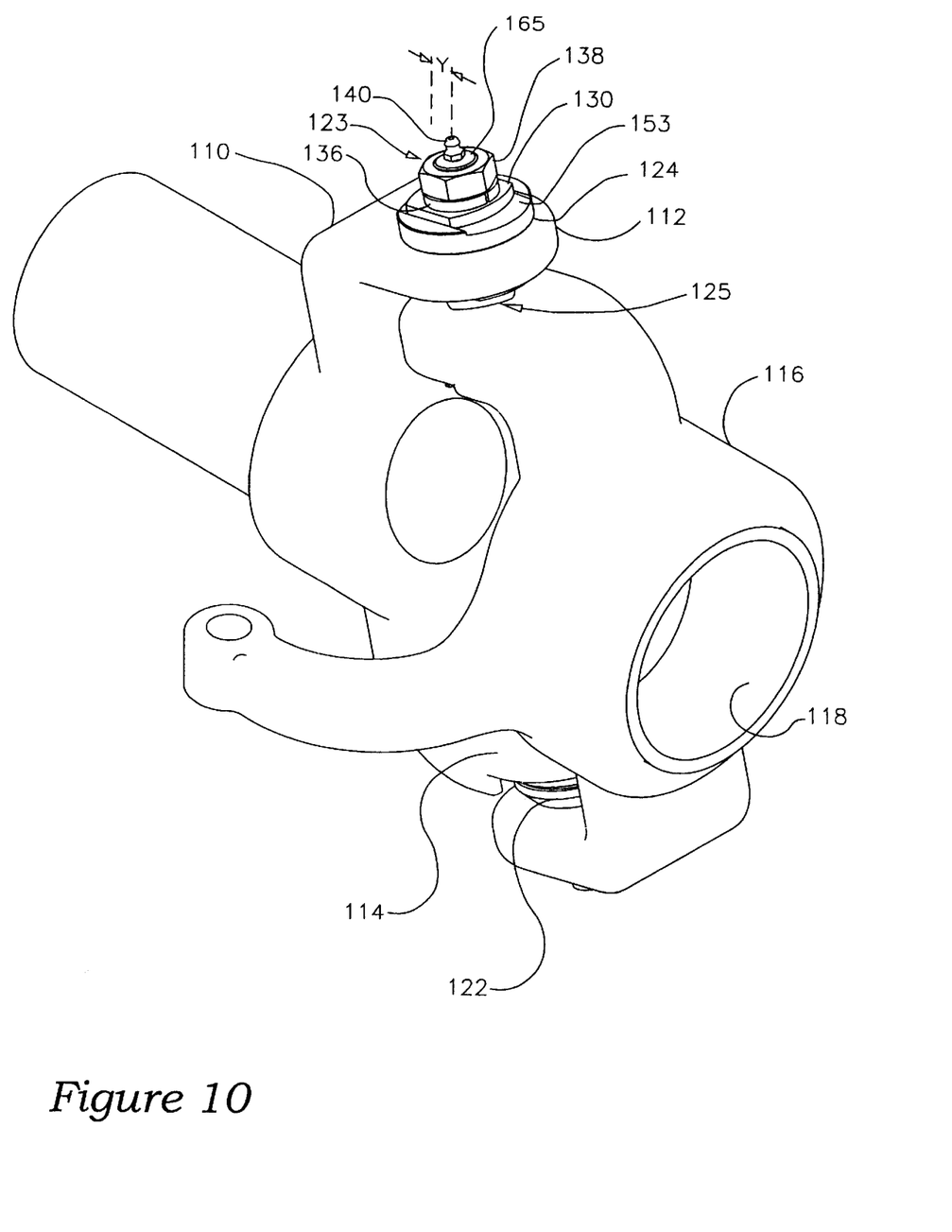
FIG. 10 illustrates the suspension system of FIG. 9 with a second and, for purposes of this application, preferred embodiment of the apparatus of this invention installed.
Figure 11:
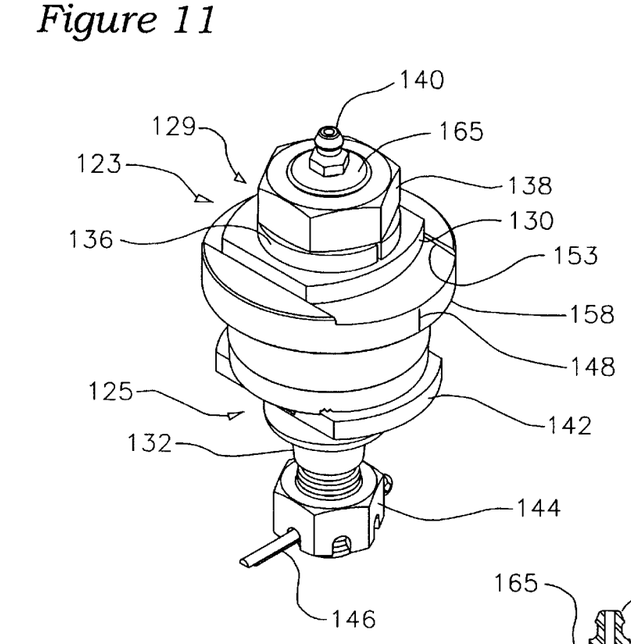
FIG. 11 is a perspective view of the camber/caster adjusting apparatus of FIG. 10.
Figure 16:
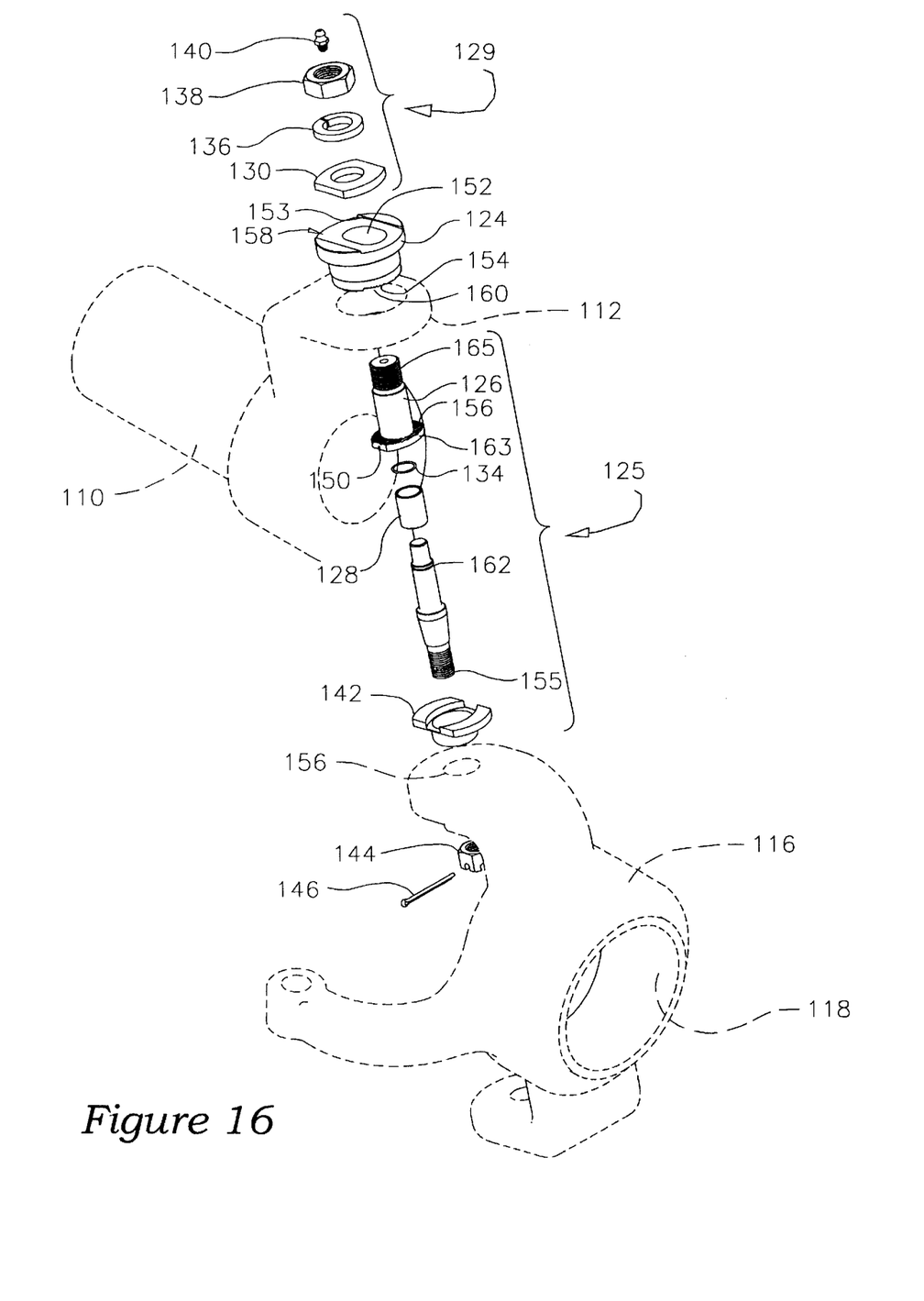
FIG. 16 is an exploded view of the camber/caster adjusting apparatus of FIG. 11.

FIG. 10 shows the suspension of FIG. 9 wherein a second, and now preferred for purposes of this application, embodiment 123 of the adjusting apparatus of this invention has been added replacing upper ball joint 120 to translate the upper ball joint connection a distance "Y" either inward towards the vehicle frame, or outward away from the vehicle frame for adjusting camber. The direction and distance for adjusting the upper ball joint connection is constrained by the configuration of elongated slot 152 (not visible in this FIGURE; see FIG. 16) in body 124 which constrains movement of support 126 in directions other than the direction of slot elongation thereby allowing lower support 126 and ultimately knuckle 16 to move from a zero degree change to some pre-determined angle based on the geometric constraints of the application.

The effect of this modification is to decrease or increase respectively the camber angle, that which is established by the plane of the tire and wheel with the vertical plane of the vehicle frame in the direction of front to back of the vehicle. This modification could also apply to lower ball joint 122 and can be installed in alternate positions to affect other than camber only angles. Slot 152 can be oriented in any radial direction so adjusting apparatus 123 can correct camber only, caster only or some combination of camber and caster angles.

As shown in FIGS. 11 through 16, adjusting apparatus 123 includes insert body 124, lower support assembly 125 and upper support assembly 129. Insert body 124 has an orientation mark 148 thereat and positioning teeth 154 at contact surface 160 thereof. Lower support assembly 125 includes support 126 having degree offset marks 150 (see FIG. 12) and matching positioning teeth 156 at an upper surface of flange 163, bearing insert 128, and shaft 132. Bearing insert 128 is placed onto the small end of shaft 132 to preserve rotatability and retain bearing insert 128. Shaft 132, with bearing insert 128 and retaining ring 134 attached (in groove 162), is then press fit into interior cavity 135 (see FIG. 15) of support 126, assembly 125 then being positioned through center elongated slot 152 of body 124, threaded end 165 of support 126 protruding through and beyond surface 158. As may be appreciated, support 126 is selectively linearly locatable along slot 152. Moreover, shaft 132 is allowed to travel axially in cavity 135 to accommodate tolerances in the vehicle axle and knuckle but is prevented by retaining ring 134 and bearing insert 128 from separating from support 126.

Matching positioning teeth 156 of support 126 may be meshed with positioning teeth 154 of body 124 at any of a plurality of possible relative locations to provide positive locking at predetermined angular increments (in one embodiment, 0.25 degree increments, from 0 to 2.5 degrees at teeth 154/156) for the subsequent camber, caster or camber/caster adjustment. Positioning teeth 154/156 may be constructed to accommodate more or fewer increments. Moreover, while the use of teeth is shown herein, other structures for positive locking and positioning of the elements could as well be used.

Upper support assembly 129, including slide 130, locking washer 136 and retaining nut 138, is then placed over the threaded end of lower support 126 to secure apparatus 123. Slide 130 is rotationally stabilizing while being laterally moveable in guide channel 153 at surface 158 of body 124 for camber, caster, or camber/caster adjustment. Grease fitting 140 is installed into an opening in threaded end 165 of support 126 so a grease lubricant can be added for wear resistance. Dust cover 142 (an elastomeric material member) is placed over the exposed end of shaft 132 and friction fit (or otherwise secured) around flange 163 of support 126 to protect the internal components from foreign materials. Castle nut 144 and cotter pin 146 are installed onto shaft 132 to provide mounting retention when shaft end 155 of shaft 132 is installed in opening 156 of the vehicle's knuckle 116.

Figure 12:
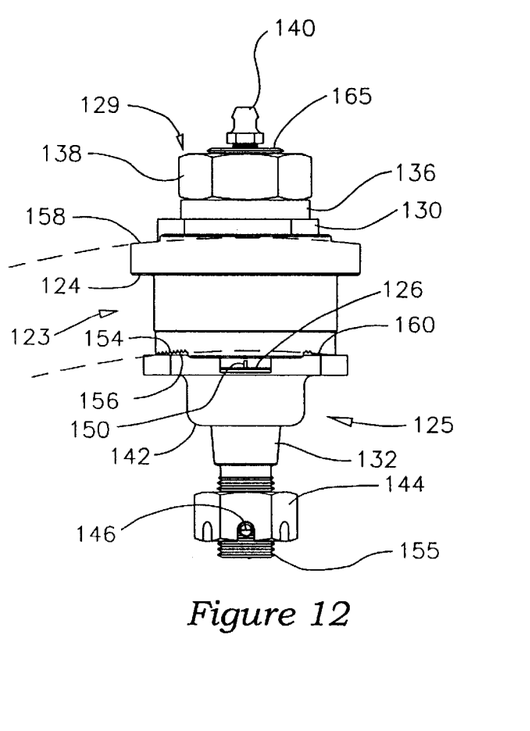
FIG. 12 is a side elevation view of the apparatus of FIG. 11.
Figure 13:
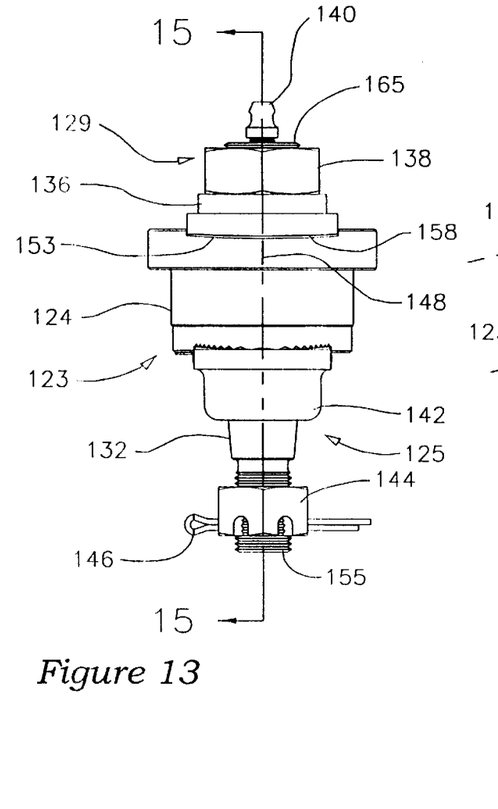
FIG. 13 is a front elevation view of the apparatus of FIG. 11.
Figure 14:
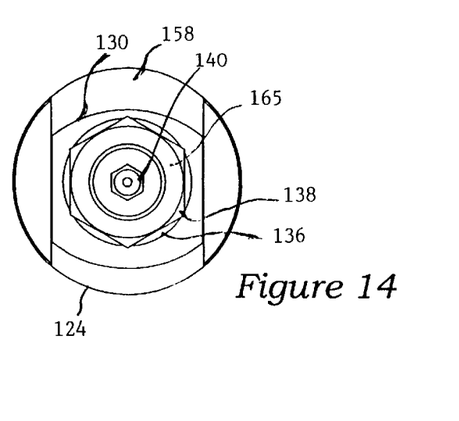
FIG. 14 is a top elevation view of the apparatus of FIG. 11.
Figure 15:
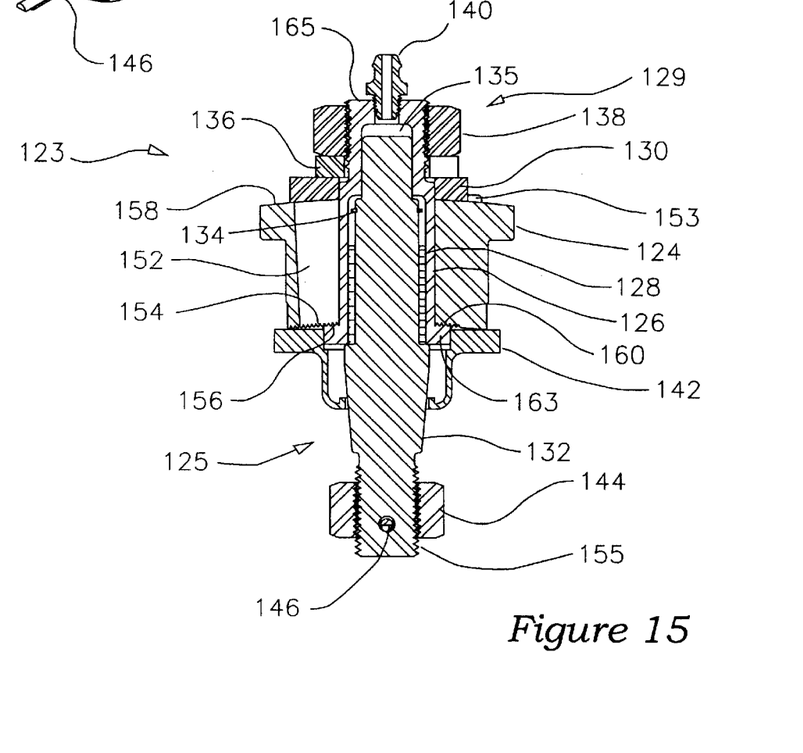
FIG. 15 is a sectional view taken along section line 15—15 of FIG. 13.

As shown in FIGS. 12 and 15, upper and lower contact surfaces 158 and 160, respectively, of body 124 are arcuate, the degree of arc of each surface defined by radii extended to the surfaces from lower ball joint 122 pivot point, thereby maintaining shaft 132, and thus knuckle 116, axis alignment. Slide 130 is complimentarily curved at its bottom (body 124 contacting) surface to match surface 158 of body 124, but is flat on its other side to provide a bearing surface for nut 138. The upper surface of flange 163 of support 126 is likewise complimentarily curved to match surface 160.

For installation of adjusting apparatus 123 into upper knuckle mount 112, upper ball joint 120 is first removed and the amount of camber and caster angle correction required is determined using standard geometric calculations. The amount of camber and caster angle needed will determine shaft 132 angular position and the azimuth orientation of body 124, and hence the entire apparatus. Once the correction is known, orientation mark 148 is aligned, with a template or some other means to the proper azimuth and body 124 is pressed into upper knuckle mount 112. Support 126 is then adjusted in body 124 with degree offset marks 150 set to the proper angular position and held in place by meshed positioning teeth 154 and matching positioning teeth 156. Retaining nut 138 is tightened to lock the apparatus in place (thereby setting the engagement of positioning teeth 154/156). Dust cover 142 is placed over shaft 132 and spindle 116 is attached to shaft 132 and castle nut 144 and cotter pin 146 secure the connection. Apparatus 123 is then filled with grease through grease fitting 140 to complete the assembly.

If subsequent adjustment to camber and/or caster angle are required, the apparatus can be removed, readjusted and re-installed as required.

Accordingly, it can be seen that the now preferred embodiment of the adjustable apparatus of this invention provides a wide range of possible offsets for restoring factory specified camber and/or caster angle to a vehicle tire and wheel in an assembly of the type shown in FIG. 9, or for setting the camber and/or caster angle to other user defined values.

What is claimed is:

1. Apparatus for selective positioning of a vehicle wheel suspension knuckle relative to a knuckle mount, the apparatus securable between the knuckle mount and the knuckle, said apparatus comprising:

an insert securable at the knuckle mount and having first and second contact surfaces, a slot extending therethrough between said contact surfaces and positioning structure defined at said second contact surface, said first contact surface of said insert including a guide channel defined thereat;

a lower support assembly securable at the knuckle and positionable through said slot of said insert to said first contact surface thereof and selectively linearly locatable and securable along said slot, said lower support assembly having mating positioning structure at a surface thereof engageable by said positioning structure of said insert; and a slide receivable at said lower support assembly, said guide channel receiving and guiding linear movement of said slide and thus said lower support assembly.

2. The apparatus of claim 1 wherein said lower support assembly includes one part having an interior cavity and a shaft held in said cavity but movable relative to said one part, said shaft securable at the knuckle at one end thereof.

3. The apparatus of claim 1 wherein said lower support assembly includes an engageable end extending above said first contact surface of said insert when said lower support assembly is positioned through said slot, said apparatus further comprising a securing member for engaging said engagable end to thereby secure engagement of said positioning structures and selected location of said lower support assembly along said slot.

4. The apparatus of claim 1 wherein said first and second contact surfaces of said insert are arcuate.

5. The apparatus of claim 4 further comprising a slide receivable at said lower support assembly and having a bottom surface to contact said first arcuate contact surface of said insert, said bottom surface of said slide having a complementary curvature matching arc of said first contact surface of said insert, said surface of said lower support assembly having a complementary curvature matching arc of said second contact surface of said insert.

6. Replacement apparatus mountable at a vehicle knuckle mount opening and at a wheel suspension knuckle to provide selectable angular correction of a vehicle wheel comprising:

an insert securable in the knuckle mount opening and having first and second contact surfaces with a guide channel defined at said first contact surface and positioning structure defined at said second contact surface, a slot extending through said insert between said contact surfaces;

a lower support assembly securable at the knuckle and having one part positionable through said slot of said insert with an engageable end thereof extending above said first contact surface of said insert, said one part selectively linearly locatable along said slot and having mating positioning structure at a surface thereof engageable by said positioning structure of said insert; and an upper support assembly including a slide and a securing member, said slide receivable at said one part of said lower support assembly and at said guide channel of said first contact surface of said insert, said securing member receivable at said engagable end of said one part of said lower support assembly to thereby secure engagement of said positioning structures and selected location of said one part of said lower support assembly along said slot.

7. The apparatus of claim 6 wherein the vehicle knuckle mount includes upper and lower mounts, said insert of said apparatus located at the upper mount, and wherein said second contact surface of said insert is arcuate, degree of arc of said second contact surface defined by a radius extended from the lower mount.

8. The apparatus of claim 6 wherein the vehicle knuckle mount includes upper and lower mounts, said insert of said apparatus located at the upper mount, and wherein said first contact surface of said insert and a bottom surface of said slide are arcuate and have a degree of arc defined by radius extended from the lower mount.

9. The apparatus of claim 6 wherein said one part of said lower support assembly has an interior cavity, said lower support assembly including a shaft securable at the knuckle and held in said cavity but movable axially in said cavity to accommodate tolerances in the wheel suspension.

10. The apparatus of claim 9 wherein lower support assembly includes a bearing insert at said interior cavity of said one part and a retaining ring mounted at a position on said shaft to prohibit, in combination with said bearing insert, separation of said shaft from said one part.

11. The apparatus of claim 6 wherein each of said positioning structures include teeth configured to accommodate positive locking when meshed at any selected one of a plurality of relative locations of said positioning structures corresponding to predetermined angular increments for vehicle wheel correction.

12. An apparatus mountable between a steering knuckle and knuckle mount to accommodate adjustment of vehicle wheel camber, caster, or camber/caster angle comprising:

a body having first and second surfaces and an elongated slot through said body between said surfaces, a guide channel being defined at said first surface, said body securable at the knuckle mount;

a support having a threaded end receivable through said elongated slot of said body, a flange at an opposite end thereof to engage said second surface of said body, and an interior cavity;

a bearing insert securable in said interior cavity of said support;

a shaft receivable through said bearing insert and securable at the knuckle;

a slide maintained over said threaded end of said support, said guide channel of said body receiving and guiding linear movement of said slide; and a retainer for engaging said threaded end of said support to thereby secure engagement of said flange of said support and said second surface of said body and selected location of said support along said elongated slot.

13. The apparatus of claim 12 wherein positioning teeth are defined at said second surface of said body and wherein mating positioning teeth are defined at said flange of said support.

14. The apparatus of claim 13 wherein each of said positioning teeth of said second surface of said body and said mating positioning teeth of said flange of said support are configured to accommodate positive locking when meshed at any selected one of a plurality of relative locations of said second surface and said flange corresponding to predetermined vehicle wheel camber, caster, or camber/caster angle correction.

15. The apparatus of claim 12 wherein said body includes an orientation marking for selected location of said body relative to the knuckle mount and wherein said support includes degree offset marking for selected offset selection of said flange of said support relative to said second surface of said body.

16. The apparatus of claim 12 further comprising a grease fitting mounted in an opening at said threaded end of said support opening to said interior cavity.

17. The apparatus of claim 12 further comprising a cover mountable at said flange of said support to protect said axle and cover said interior cavity of said support and said slot of said body.

18. The apparatus of claim 12 wherein the knuckle mount includes upper and lower mounts, said body of said apparatus located at the upper mount, and wherein said second surface of said body is arcuate, degree of arc of said second surface defined by a radius extended from the lower mount.

19. The apparatus of claim 18 wherein the knuckle mount includes upper and lower mounts, said body of said apparatus located at the upper mount, and wherein said first surface of said body and a bottom surface of said slide are arcuate and have a degree of arc defined by radius extended from the lower mount thereby maintaining said shaft, and thus the knuckle, axis alignment.

* * * * *